US008239544B2

(12) United States Patent
Rosenbloom et al.

(10) Patent No.: US 8,239,544 B2
(45) Date of Patent: Aug. 7, 2012

(54) REMOVABLE STORAGE CONTENT TRANSFER

(75) Inventors: Oren Rosenbloom, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 11/154,633

(22) Filed: Jun. 17, 2005

(65) Prior Publication Data

US 2007/0011264 A1    Jan. 11, 2007

(51) Int. Cl.
    *G06F 15/16* (2006.01)
(52) U.S. Cl. ............ 709/227; 709/213; 718/1; 718/100; 711/115
(58) Field of Classification Search .................. 709/227, 709/232, 213; 726/1, 28; 713/201, 169; 718/1, 100; 711/115
    See application file for complete search history.

(56) References Cited

U.S. PATENT DOCUMENTS

| | | | |
|---|---|---|---|
| 6,372,974 B1 * | 4/2002 | Gross et al. | 84/609 |
| 6,965,614 B1 * | 11/2005 | Osterhout et al. | 370/466 |
| 7,036,012 B2 * | 4/2006 | Charrin | 713/169 |
| 7,680,643 B2 * | 3/2010 | Ragnunath et al. | 703/20 |
| 7,814,559 B2 * | 10/2010 | Horikiri | 726/28 |
| 2001/0038032 A1 * | 11/2001 | Kang et al. | 235/375 |
| 2001/0051996 A1 * | 12/2001 | Cooper et al. | 709/229 |
| 2002/0080969 A1 * | 6/2002 | Giobbi | 380/277 |
| 2002/0163780 A1 * | 11/2002 | Christopher | 361/686 |
| 2005/0114711 A1 * | 5/2005 | Hesselink et al. | 713/201 |
| 2006/0168351 A1 * | 7/2006 | Ng et al. | 709/248 |
| 2006/0235796 A1 * | 10/2006 | Johnson et al. | 705/44 |
| 2006/0277600 A1 * | 12/2006 | Goodwill et al. | 726/9 |
| 2006/0288165 A1 * | 12/2006 | Rosenbloom et al. | 711/115 |
| 2007/0011264 A1 * | 1/2007 | Rosenbloom et al. | 709/217 |
| 2007/0026371 A1 * | 2/2007 | Wood | 434/317 |
| 2007/0112880 A1 * | 5/2007 | Yang et al. | 707/201 |
| 2007/0113228 A1 * | 5/2007 | Raghunath et al. | 718/1 |
| 2007/0152058 A1 * | 7/2007 | Yeakley et al. | 235/462.01 |
| 2008/0004035 A1 * | 1/2008 | Atkins et al. | 455/454 |
| 2008/0307109 A1 * | 12/2008 | Galloway et al. | 709/232 |
| 2009/0094672 A1 * | 4/2009 | Bunger et al. | 726/1 |

OTHER PUBLICATIONS

First Office Action dispatched Mar. 4, 2011 re Chinese Appl. No. 201010238504.9.
Notice of Rejection dispatched Apr. 21, 2011 re Japan Appl. No. 2008516869.

* cited by examiner

*Primary Examiner* — Thua Ha Nguyen
(74) *Attorney, Agent, or Firm* — Shook, Hardy & Bacon LLP (57) ABSTRACT

A system and method for removable storage content transfer. A removable storage medium is passed between a terminal and a device, and a device file stored on the removable storage medium is used to communicate media content and other information between the terminal and the device. The device file may include "session information," such as information that can be used to represent a network or direct connect session between the terminal and the device file. The session information may include, for example, media content and header information. The device file may allow the terminal to treat the removable storage medium as a locally connected device in some situations. For example, the terminal may create a device stack using device parameters stored on the removable storage medium, and use the device stack to communicate with the device via the removable storage medium.

20 Claims, 5 Drawing Sheets

REMOVABLE STORAGE CONTENT TRANSFER

CROSS-REFERENCE TO RELATED APPLICATIONS

None.

STATEMENT REGARDING FEDERALLY SPONSORED RESEARCH OR DEVELOPMENT

None.

BACKGROUND

Many consumer electronic devices, such as cameras, personal music players, and the like, store files or other content capable of being played back. Increasingly, a personal computer is being used as primary storage for such content. Electronic devices are therefore being designed to interface with personal computers to exchange content. For example, a digital camera may transfer photograph files to a personal computer hard drive. As another example, a personal music player may receive music files from a personal computer.

Storage cards, such as, for example, a Compact Flash (CF) memory card, Secure Digital (SD) memory card, a Memory Stick, or the like, may be used to transfer content between an electronic device and a personal computer. Such storage cards may include, for example, a removable memory device including flash memory. A device may write to a storage card, and the storage card may then be removed from the device and inserted into a personal computer, which may retrieve information from the storage card. Similarly, a personal computer may write to a storage card, and the storage card may then be removed from the personal computer and inserted into the device, which may retrieve information from the storage card. For example, a storage card may be used to transfer photographs from a camera to a personal computer, or to transfer music files from a personal computer to a personal music player.

In some cases, it may be advantageous for a personal computer to process the content before or after a transfer. For example, a music file may be stored in the personal computer as a relatively large high-fidelity file. Prior to transferring the music file to a personal music file for playback, it may be advantageous to transcode the music file into a smaller low-fidelity file. As another example, metadata may be added to photographs received from a camera.

In many cases, content, such as, for example, copyrighted media content, may include protection features, such as by implementing Digital Rights Management (DRM) features. However, multiple technical mechanisms for content protection exist, and various devices may handle content protection mechanisms differently. Furthermore, DRM may specify restrictions on a particular content, a particular device, or both. For example, a subscription DRM service might allow a user unlimited playback of all content on a particular personal music player, such as allowing unlimited playback of all music for one month. As another example, a per-use DRM service might allow a user to play a particular content a particular number of times, such as allowing a user to play a movie once, or allowing a user to play a song three times. The multiplicity of technical mechanisms, the different types of restrictions, and the different methods of handling DRM used by different devices may each complicate the transfer or playback of DRM content.

SUMMARY

In various embodiments, a system and method for removable storage content transfer are provided. A removable storage medium is passed between a terminal and a device, and a device file stored on the removable storage medium is used to communicate media content and other information between the terminal and the device. The device file may include "session information," such as information that can be used to represent a network session between the terminal and the device file. The session information may include, for example, media content and header information along with any other communication steam that may otherwise occur if two or more devices were directly connected via wired or wireless communication protocol. The device file may allow the terminal to treat the removable storage medium as a locally connected device in some situations. For example, the terminal may create a device stack based upon the device file using device parameters stored on the removable storage medium, and use the device stack to communicate with the device via the removable storage medium.

A computer-readable medium may store instructions executable to cause a computer to perform a method. The method may include obtaining at least one device parameter from a removable storage medium, the at least one device parameter specifying at least one property of an external device. The method may further include creating a device stack based on the at least one device parameter and generating session information based on the device stack. The method may also include transmitting the session information to be stored in a device file on the removable storage medium.

A computer-readable medium may store a data structure, the data structure including a first field. The first field may contain data indicative of a device file, the device file configured to contain session information, the session information representing a session between a terminal and an external device.

A computer-readable medium may store instructions, the instructions being executable to cause a device to perform a method. The method may include obtaining first session information from a device file on a removable storage medium, the first session information being generated by a terminal. The method may further include transmitting second session information to be stored in the device file on the removable storage medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawings figures, wherein.

DETAILED DESCRIPTION

In one implementation, the invention relates to a system and method for removable storage content transfer.

Figure 1:
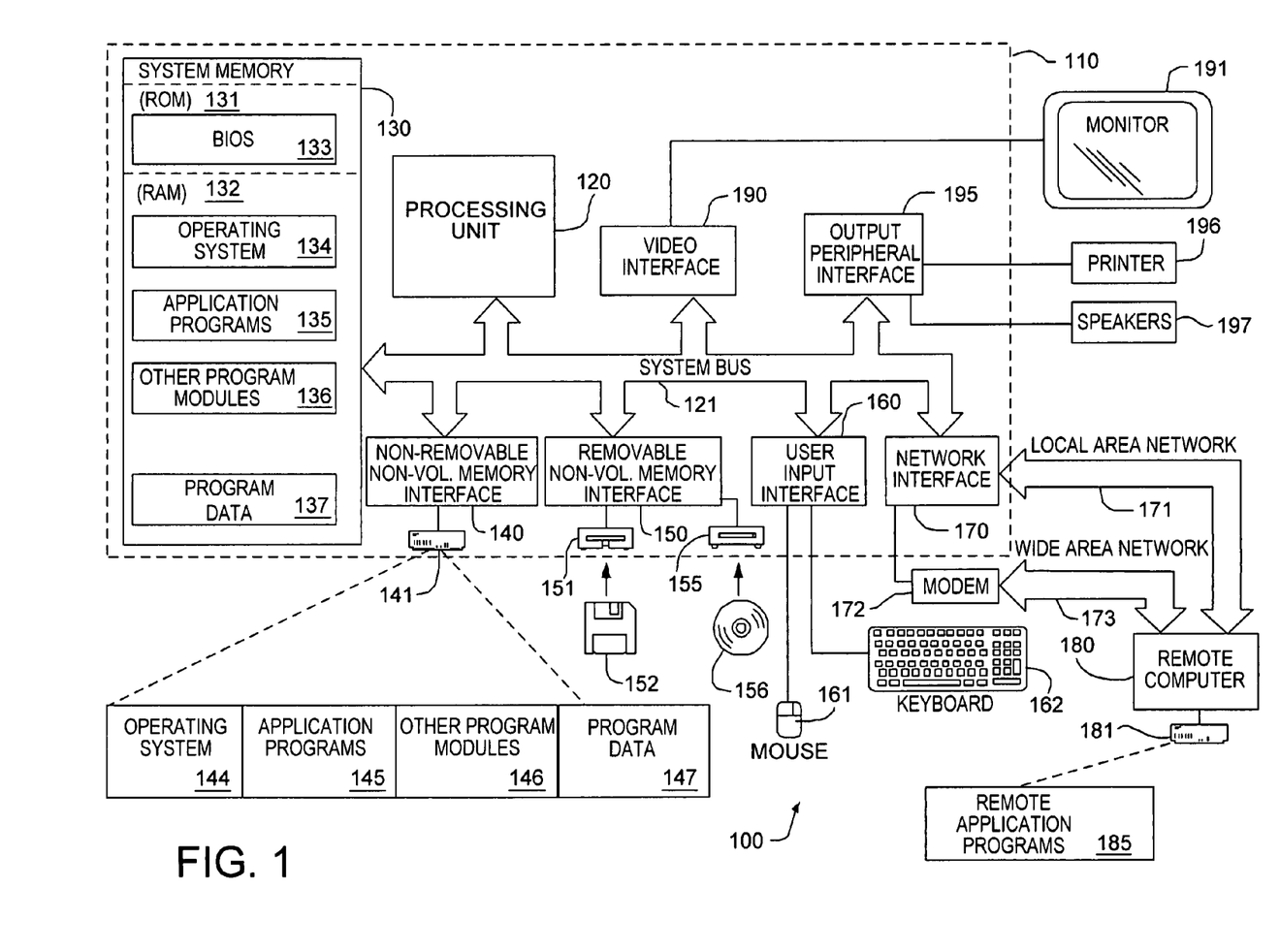
FIG. 1 is block diagram illustrating a computerized environment in which embodiments of the invention may be implemented.

FIG. 1 illustrates an example of a suitable computing system environment 100 on which the system for removable storage content transfer may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
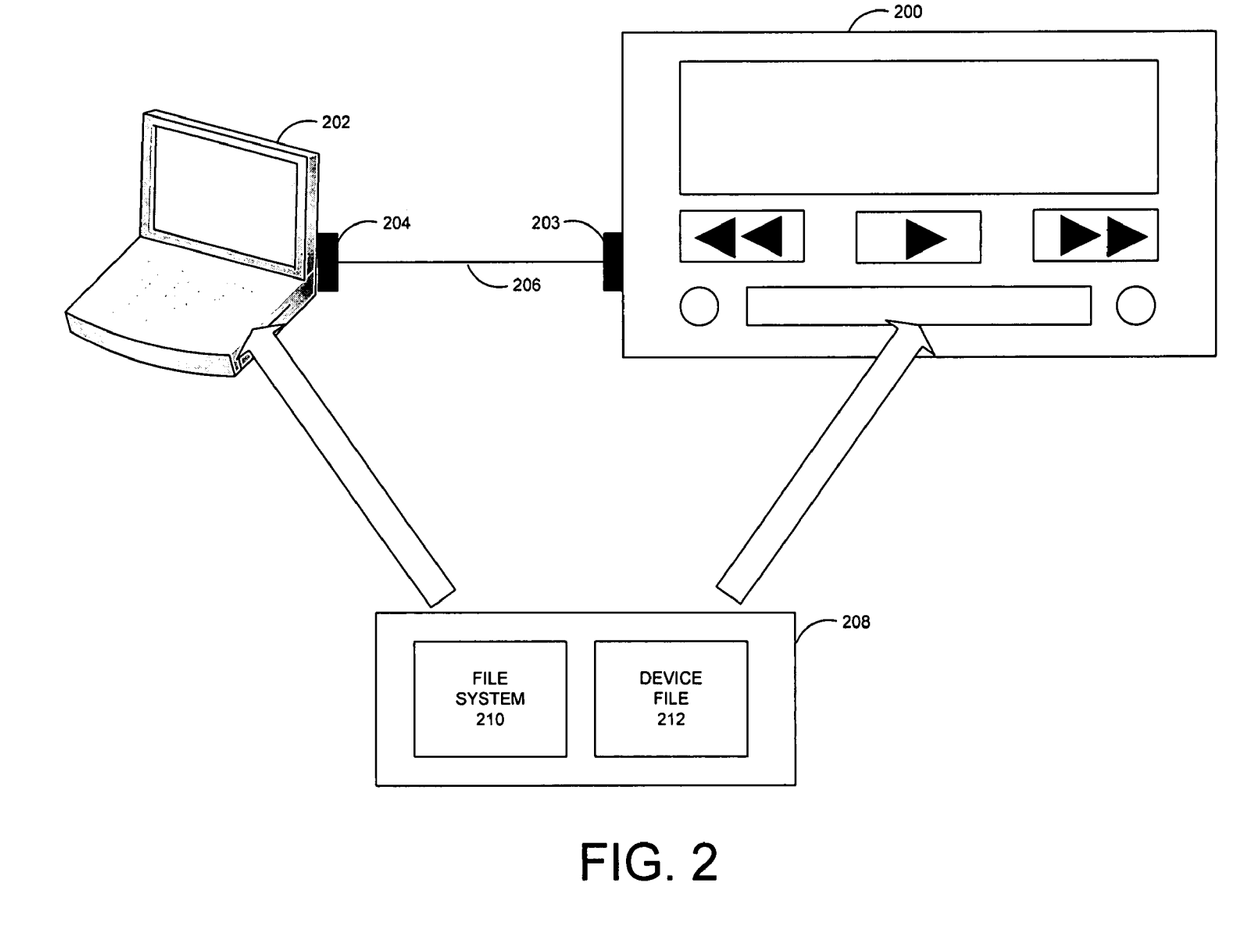
FIG. 2 is a block diagram illustrating an overview of a system in accordance with an embodiment of the present invention.

FIG. 2 is a block diagram illustrating an overview of a system in accordance with an embodiment of the present invention. As shown in FIG. 2, a device 200, such as a consumer electronic device, may receive content from or transfer content to a terminal 202, such as a personal computer. Each of the device 200 and the terminal 202 may be equipped with one or more storage readers and/or writers. The device 200 may be, for example, an automotive built-in media system, a portable digital stereo system, a home entertainment system with built-in storage, a camera, a portable gaming device, a mobile telephone, or any other electronic system. In some implementations, a plurality of devices 200 may receive content from or transfer content to the terminal 202.

The device 200 and the terminal 202 both implement a protocol that allows for configuration of the device 200 and the exchange of information between the device 200 and the terminal 202 when a network connection 204 is established between the device and the PC. For example, both the device 200 and the terminal 202 may have Universal Serial Bus (USB) connectors 203, 204 so that the device 200 can be connected to the terminal 202 via a direct USB cable 206 or some combination of USB cables and USB hubs. In some implementations, Media Transfer Protocol (MTP) is used as the configuration and transfer protocol, and both the device 200 and the terminal 202 may implement MTP allow for configuration of the device 200 and the transfer of media objects between the device 200 and the terminal 202. When the device 200 and the terminal 202 are connected via the USB cable 206, MTP information will be carried over the USB cable 206 such that configuration and transfer operations can be performed. Those skilled in the art will appreciate that other configuration and transfer protocols could be used, and that various transport protocols could be used. For example, MTP or another configuration and transfer protocol could be used in conjunction with Transmission Control Protocol/Internet Protocol (TCP/IP). As another example, Picture Transfer Protocol (PTP) could be carried over the USB cable 206 or used in conjunction with another transport protocol.

When a network connection is established between the device 200 and the terminal 202, via the USB cable 206 or some other connection, discrete packets of information may be sent from the device 200 to the terminal 202, or from the terminal 202 to the device 200. The time it takes to perform such a transfer may depend on the latency of the network connection, and how reliable such transmission is may depend on the reliability of the network carrying the connection. Both the configuration and transfer protocol and the transport protocol may include mechanisms to make the best use of the network connection (reduce the latency) while reducing transmission errors (improving the reliability).

The communication between the device 200 and the terminal 202 over the USB cable 206 or other network connection may include one or more sessions. Each session is, for example, a lasting communication involving the exchange of many packets.

The configuration and transfer protocol being used, such as MTP, may define one or more transfer protocol entities, which are software modules useful for configuration and transfer; such as operations, result codes, object formats, data types, data sets, data file references, and the like. The configuration and transfer protocol, such as MTP, may further define how these transfer protocol entities may be used. When configuration or transfer is performed via a USB cable 206 or other network connection, one or more of these transfer protocol entities may be sent within discrete packets as part of a session.

The device 200 and the terminal 202 may share a storage medium 208. In one implementation, the storage medium 208 is a removable read/write storage medium such as a memory card or magnetic disk. When the storage medium 208 is inserted into the device 200 or otherwise placed in communication with the device 200, software running on the device 200 may access the contents of the storage medium 208. Likewise, when the storage medium 208 is inserted into the terminal 202 or otherwise placed in communication with the terminal 202, software running on the terminal 202 may access the contents of the storage medium 208. The storage medium 208 may be formatted with a file system 210 that allows individual files to be created, read, written, or deleted. Software running on both the device 200 and the terminal 202 may implement support for the file system 210, providing access to files stored on the storage medium 208 to both the device 200 and the terminal 202.

The storage medium 208 may be routinely moved back and forth between the device 200 and the terminal 202. In this case, the storage medium 208 may be formatted in such a way that software running on both the device 200 and the terminal 202 can access and modify information in files carried on the storage medium 208. When the device 200 and the terminal 202 communicate by modifying files stored on the storage medium 208, the storage medium 208 can be treated as a network connection.

As discussed above, when a network connection is used for configuration or transfer, a session is established, including one or more discrete packets sent over a USB cable 206 or other network connection. The packets may included transfer protocol entities; such as operations, result codes, object formats, data types, data sets, data file references and the like; that are defined by MTP or another configuration and transfer protocol.

Similarly, when configuration or transfer is performed via a storage medium 208 rather than a network connection, these transfer protocol entities may be used in a like fashion, to carry out device configurations or transfers. Instead of sending these transfer protocol entities within discrete packets over USB cable 206 or other network connection, the transfer protocol entities may be recorded within a device file 212 on the storage medium 208. The information stored in the device file 212 may be recorded, for example, as a byte stream. The device file 212 may include all the information that would be transmitted during session, and the device file 212 may therefore be said to "represent" a session. In one implementation, all the transfer protocol entities, header information, and other information that would be communicated between the device 200 and the terminal 202 during a session are recorded into the device file 212.

As the storage medium 208 is passed between the device 200 and the terminal 202, information is passed between the device 200 and the terminal 202, allowing for bi-directional communication. The device file 212 may record the transfer protocol entities sent in either direction, including packet "headers" that describe where the packet originated (for example, from the device 200 or the PC 202) and the packet's destination. Likewise, the device file 212 may include other packet header information, such as sequence numbers, session identifiers, transaction identifiers, etc. that may be used to represent a complete session. A device file 212 can be viewed as a "serialized" session between one device 200 and one terminal 202, in the sense that the information in a device file 212 is sufficient to construct a session that would have the intended effects on both the device 200 and the terminal 202.

When the storage medium 208 includes a device file 212 representing a session, the storage medium 208 may be treated in some instances as a locally connected device. For example, programs, protocols, and data structures that are used to transfer information to and from locally connected devices may be utilized. As a particular example, the Windows operating system may use a device stack to transfer information to and from locally connected devices. The device file 212 representing a session allows the operating system to communicate with the device using a device stack.

Figure 3:
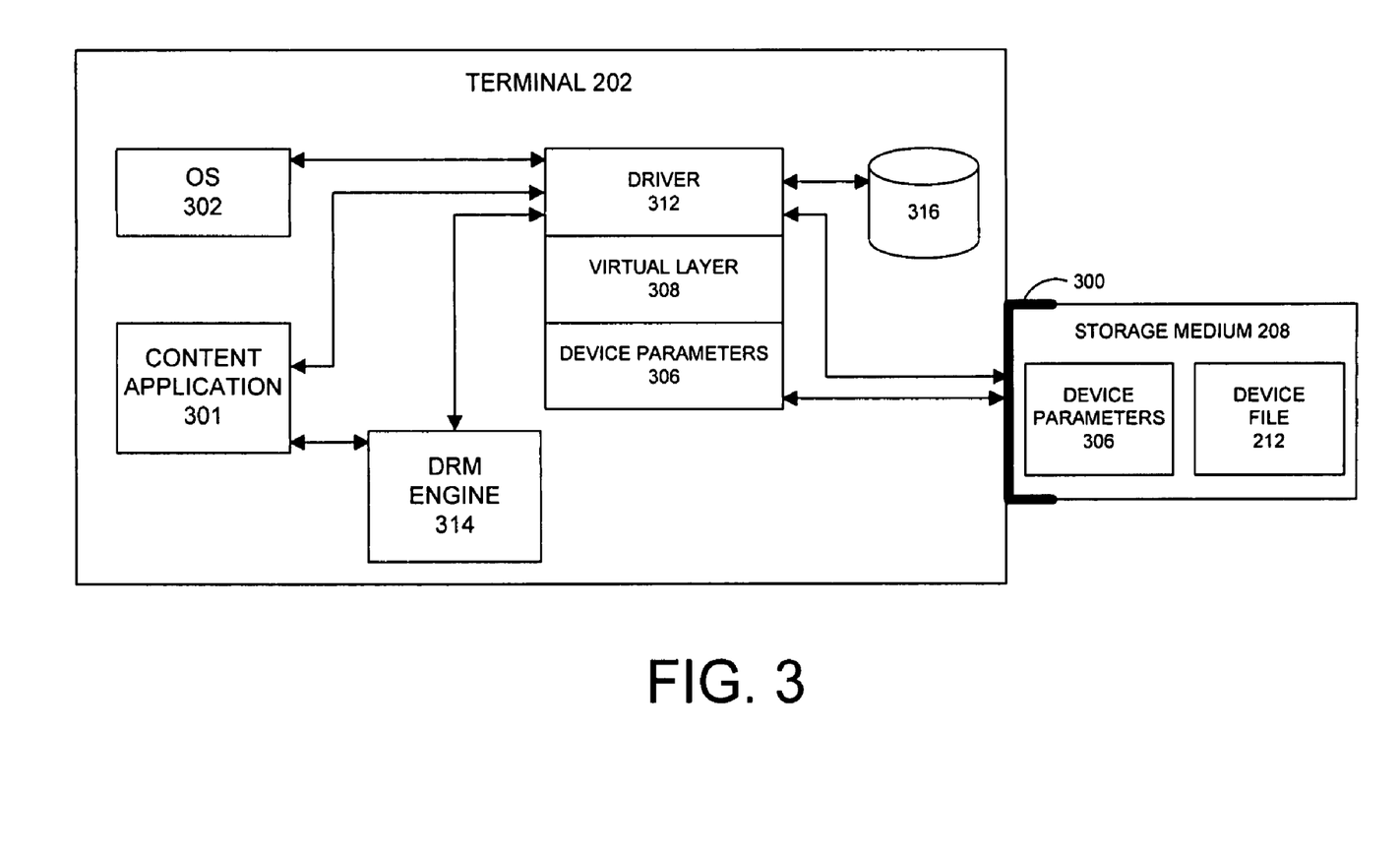
FIG. 3 is a block diagram illustrating an overview of a system in accordance with an embodiment of the present invention.

FIG. 3 is a block diagram illustrating an overview of a system in accordance with an embodiment of the present invention. As shown in FIG. 3, a terminal 202 may be configured to receive a storage medium 208, such as a memory card or magnetic disk, via an input 300, such as a card slot, disk drive, or the like. The storage medium 208 may be used, for example, to communicate with a device (not shown in FIG. 3) by means of passing the storage medium 208 back and forth between the terminal 202 and the device.

The terminal 202 may include a content application 301 that communicates with the device via the storage medium 208. For example, in one implementation, the content application 301 may be a digital media player configured to communicate with a personal music player device. In this case, the content application 301 is configured to transmit media files to, or receive media files from, the personal music player. In another implementation, the content application 301 may be an application for storing and manipulating photographs. In this case, the content application 301 may be configured to receive photographs from, or transmit photographs to, a camera device. Other implementations including other content applications 301, other content types, and other devices are possible.

The terminal 202 also includes, for example, an operating system 302. The operating system 302 may be configured to communicate with the device via the storage medium 208.

When the storage medium 208 is inserted into the input 300, a device stack 304 may be created. In one implementation, the device stack 304 is created by the operating system 302. The device stack 304 is, for example, software that is configured to facilitate communication by simulating a connection to the device.

In order to create the device stack 304, device parameters 306 may be read from the storage medium 208 and stored in the terminal 202. The device parameters 306 may be, for example, parameters specifying properties or attributes of the device, or otherwise describing the device. The device parameters 306 may include such information as the type of device, the type of content accepted by the device, the compression schemes used by the device, available memory on the device, Digital Rights Management information for the device, and the like. The device parameters 306 may be written to the storage medium, for example, by the device during formatting, as discussed further hereinbelow with reference to FIG. 5.

In order to create the device stack 304, a virtual layer 308 may be created, for example, based on the device parameters 306. In one implementation, the virtual layer 308 simulates the operation of the device. The combination of the device file 212 and the virtual layer 308 may be said to comprise a "virtual device." The operation of the virtual device may be such that, from the perspective of the terminal 202, the device appears to actually be connected to the terminal 202.

The device stack may also contain a driver 312. The driver 312 is, for example, a software module configured to communicate between the storage medium 208 and the content application 301 or the operating system 302. In one implementation, the driver 312 receives a device file 212 from the storage medium 208 or otherwise accesses the device file 212 on the storage medium 208. The driver 312 may also receive information and/or instructions from the content application 301 and/or the operating system 302. Based on the information in the device file 212, the information received from the content application 301, and/or the information received from the operating system 302, the driver 212 determines whether content should be transmitted from the device file 212 to the terminal 202, and whether content should be transmitted from the terminal 202 to the device file 212.

If the driver 312 determines that content should be written from the device file 212 to the terminal 202, the driver 312 retrieves the content from the device file 212. The driver 312 then determines whether any action should be taken on the content. The driver 312 determines whether action should be taken on the content, for example, by examining the virtual layer 308, the content application 301, and/or the operation system 302. Examples of action taken on content include, for example, compressing the content, adding metadata to the content, performing DRM functions associated with the content, or the like. If action should be taken on the content, the driver 312 performs such action, for example, by examining the virtual layer 308. In performing action on the content, the driver 312 may communicate with one or more DRM engines 314. After action is taken on the content, the modified content may be stored, for example, to a database 316. One or more transfer protocol entities indicating the operations that occurred, such as transfer protocol entities indicating that the content was received, modified, and/or stored may be written to the device file 212.

If the driver 312 determines that content should be written from the terminal 202 to the device file 212, the driver 312 retrieves the content, for example, from the database 316, the content application 301, or another location within the terminal 202. The driver 312 then determines whether any action should be taken on the content. The driver 312 determines whether action should be taken on the content, for example, by examining the virtual layer 308, the content application 301, and/or the operating system 302. Examples of action taken on content include, for example, compressing the content, adding metadata to the content, performing DRM functions associated with the content, or the like. If action should be taken on the content, the driver 312 performs such action, for example, by examining the virtual layer 308. In performing action on the content, the driver 312 may communicate with one or more DRM engines 314. After action is taken on the content, the modified content may be written, for example, to the device file 212. The modified content is stored, for example, as a bit stream in the device file 212. The modified content may be stored, for example, in conjunction with header data, transfer protocol entities, or other data.

Because content may be modified on the terminal 202, the content stored in the device file 212 may be matched to the stream parameters, DRM model, and other expectations of the device. This may result in a smooth user experience that allows playback or other content consumption on the device with little or no input required from a user.

An example explaining the system from end to end is as follows: A storage card may be used as a means to connect two or more devices that would otherwise never be directly connected. These devices understand a common communication protocol, such as MTP as an example. A set of protocol operations can be serialized, or saved to a file that is stored on the removable storage medium, such as a compact flash memory card. One such example of a session is a mechanism for explaining the types of files that a device may support. For example, a particular device that only supports the transfer of photos may record to its device file on its removable storage that only photos are understood by the device. When this removable storage is directly inserted into a terminal, the terminal would parse the device file and then instantiate a device stack with an extra virtual layer bound to the device file that emulates the actual device. As such, the terminal believes it is directly communicating with the device and will determine that only photos can be transferred to/from the device. The terminal may then choose, for example, to transfer a photo to that virtual device. This operation will result in another device file on the removable storage that indicates that a new object is being created on the device, and then the point to the actual photo file that was saved to the removable storage. When this removable storage is then inserted back into the device, the device will read the new device file that was created by the terminal and conclude that a new photo file was added and the device file explains the attributes of this new photo file. Examples of some attributes, or metadata could include, the size of the file, the name of the file, the date/time the file was transferred, etc. This example is merely illustrative and those skilled in the art will appreciate that many other implementations and applications are possible.

In one implementation, a plurality of devices may use the same storage medium 208. In this case, each device may create a separate device file 212. In this implementation, each device file 212 may include a device identifier, such as, for example, a unique device identification string. Details of such an implementation will be described further with reference to FIG. 5.

Figure 4:
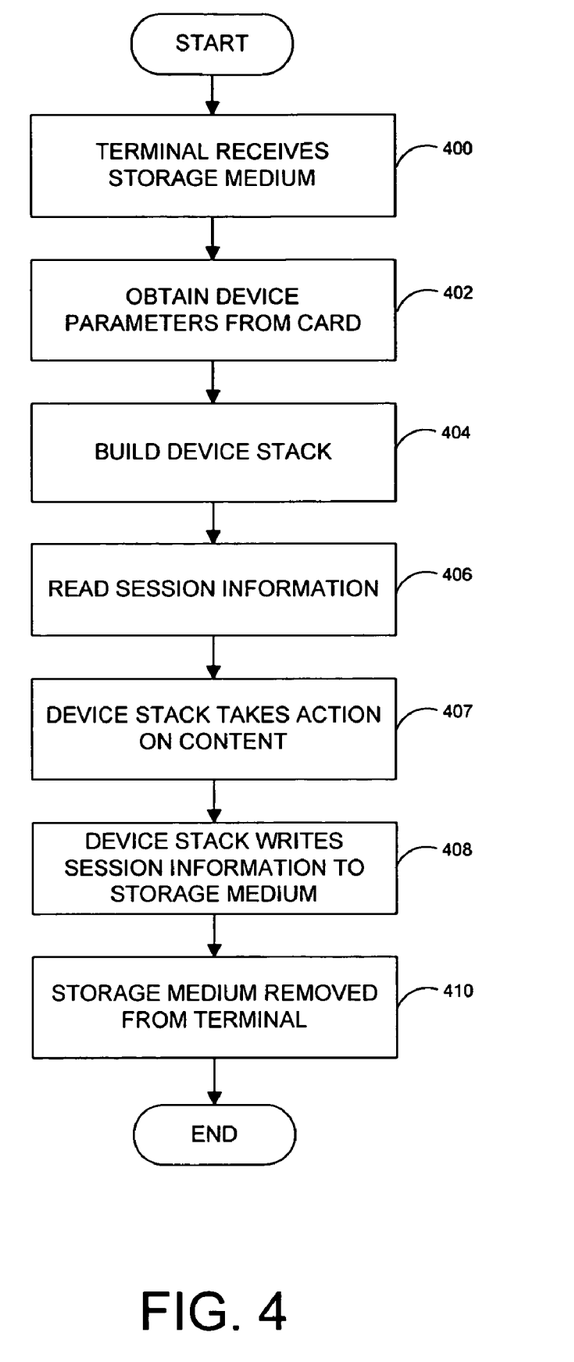
FIG. 4 is a flow chart illustrating a method for communicating with a device, in accordance with an embodiment of the present invention.

FIG. 4 is a flowchart illustrating a method for communicating with a device. As shown in FIG. 4, the method may begin in step 400, wherein a terminal may receive a storage medium. For example, the storage medium may be inserted into a slot or disk drive, or otherwise placed in communication with the terminal.

The method may continue in step 402, wherein a terminal may obtain device parameters from the storage medium. For example, the storage medium may be inserted into an input such as a slot or disk drive, and the device parameters may be obtained.

The method may continue in step 404, wherein a device stack may be built. The device stack may be, for example, software that is configured to facilitate communication by simulating a connection to the device. The device stack may be built, for example, by the operating system based on the device parameters obtained from the storage medium The device stack may include, for example, a virtual layer configured to simulate the operation of the device and a driver configured to communicate between the storage medium the operating system or a content application.

In step 406, session information may be read from the storage medium. Session information may be read 406, for example, from a device file on the storage medium. Reading session information 406 may include, for example, receiving content from the storage medium to the terminal, receiving requests for content from the storage medium, or receiving any other information that might be communicated during a session.

In step 407, action may be taken on the content. In an implementation of the invention, action taken on the content is performed via the terminal. In this implementation, the terminal is therefore responsible, for example, for actions such as compressing the content, adding metadata to the content, performing DRM functions associated with the content, or performing other actions to facilitate communication between the device and the terminal.

Taking action on the content 407 may be performed, for example, by the device stack, in communication with a DRM engine, an operating system, and/or a content application. If content is received in the session information in step 406, taking action on the content may include processing the received content and storing it in the terminal. For example, metadata may be added or DRM functions may be performed prior to storing received content in the terminal. If a request for content is received in step 406, taking action on the content may include processing content to be transmitted to the device. For example, content may be retrieved from local storage on the terminal, and the content may be compressed or DM functions may be performed in preparation for transmitting the content to the device.

In step 408, session information may be written to the storage medium. Writing session information includes, for example, storing session information, including one or more media transfer entities, as a byte stream in the device file. The session information written to the storage medium may include content to be transferred to the device. The session information written to the storage medium may further include an indication of the content transfer, a request for further content, session information, header information, or other information used to represent a session.

In step 410, the storage medium may be removed from the terminal. For example, the storage medium may be removed from a card or disk drive, or otherwise withdrawn from communication with the terminal.

Figure 5:
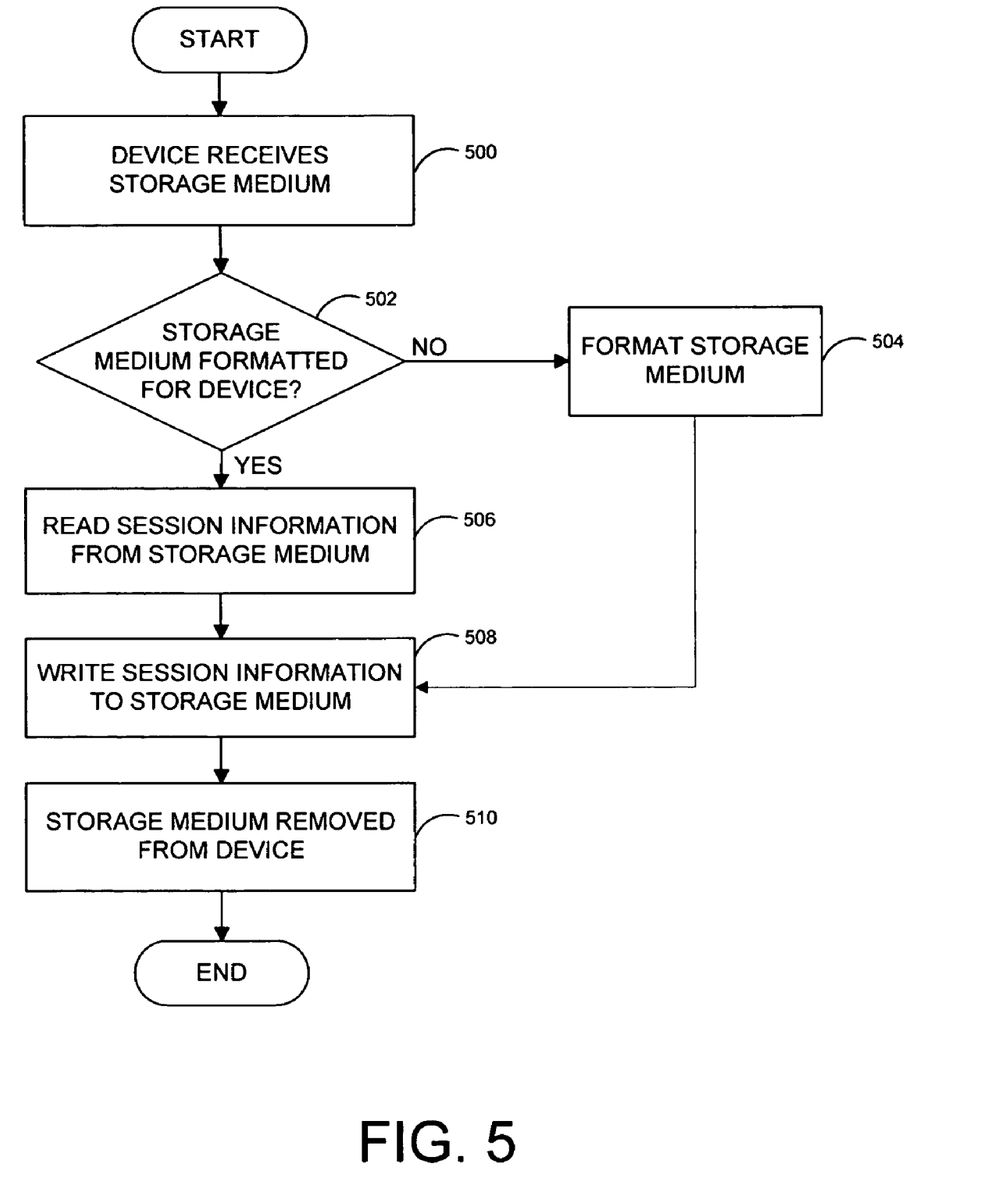
FIG. 5 is a flow chart illustrating a method for communicating with a terminal, in accordance with an embodiment of the present invention.

FIG. 5 is a flowchart illustrating a method for communicating with a terminal. As shown in FIG. 5, the method may begin in step 500, wherein a device may receive a storage medium. For example, the storage medium may be inserted into a slot or disk drive, or otherwise placed in communication with the device.

The method may continue in step 502, wherein it is determined whether the storage medium has been formatted for the device. In one implementation, the device determines whether or not will determine whether the storage medium has been formatted for the device, for example, by detecting the presence of device-specific information on the storage medium. For example, the device may detect the presence of a device file, device parameters, a device identifier, or other information on the storage medium.

If the storage medium has not been formatted for the device, in step 504, the device may format the storage medium. Formatting the storage medium may include, for example, creating a device file, storing a device identifier, and storing device parameters. The method may continue in step 508.

If it is determined in step 502 that the storage medium has been formatted for the device, the method may continue in step 506, wherein session information may be read from the storage medium. Session information may be read 506, for example, from a device file on the storage medium. Reading session information 506 may include, for example, transferring content from the storage medium to the device.

In step 508, session information may be written to the storage medium 508. Writing session information includes, for example, storing session information, including one or more media transfer entities, as a byte stream in the device file. The session information written to the storage medium may include content to be transferred to the terminal. The session information written to the storage medium may further include. An indication of the content transfer, a request for further content, session information, header information, or other information used to represent a session.

In an implementation of the invention, action taken on the content is performed via the terminal, so that the device can write content directly to the device file. In this implementation, the device is therefore not responsible, for example, for actions such as compressing the content, adding metadata to the content, performing DRM functions associated with the content, or performing other actions to facilitate communication between the device and the terminal.

In step 510, the storage medium may be removed from the device. For example, the storage medium may be removed from a card slot or disk drive, or otherwise withdrawn from communication with the device.

In implementations of the invention, a plurality of devices may use the same storage medium 208. In this case, each device may create a separate device file 212. In this implementation, each device file 212 may include a device identifier, such as, for example, a unique device identification string.

When the storage medium is placed in communication with the terminal, the terminal searches the storage medium for a target device file to use to communicate with a device. In one implementation, if more than one device file is found, a user may be contacted to determine which device file to use. In another implementation, a decision made be used based on rules, such as user-selected preferences. For example, such a rule may state that the device that has last been used should be communicated with. As another example, such a rule may state that the first device file encountered should be used. Other rules and schemes for communicating with storage media containing multiple device files are possible.

As target devices are frequently constrained, the large quantity of media content on the storage card may be organized to allow for improved device operation. To achieve this, an accelerator can be used in conjunction with the invention. For example, an accelerator may write an accelerator file to the storage medium, for example, as media content storage is being completed. The accelerator file may provide content metadata that may be accessed, for example, by a user interface for the device. An accelerator scheme used in conjunction with the present invention may be, for example, independent of the block file system which is used to format the card.

In some implementations, such as in the case of a device that is not capable of recording media content, an accelerator file such as, for example, a device-optimized metadata database, may be used. In various implementations, other accelerators may be used.

Implementations provide a coherent user experience by providing the terminal an accurate snapshot of the device parameters at the time when it runs the content. Implementations provide a standard scheme of encoding the device parameters, which allows the terminal to enable optimal device operation when transfer is done via a storage medium. The terminal can therefore create an accelerator file for use by the device, as well as taking action on media content to prepare the media content for the device.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer-readable storage memory storing instructions thereon, the instructions being executable to cause a computer to perform a method of content transfer, the method comprising:

at the computer, obtaining at least one device parameter from a removable storage medium, the at least one device parameter specifying at least one property of an external device, wherein content transfer occurs between the computer and the external device via the removable storage medium, wherein further the removable storage medium is movable between the computer and the external device;

creating a device stack on the computer based on the at least one device parameter, wherein the device stack is software configured to facilitate communication by simulating a connection to the external device;

based on the at least one device parameter, creating a virtual layer that simulates operation of the external device such that the external device appears to be connected to the computer;

generating session information based on the device stack; and transmitting the session information from the computer to the removable storage medium, wherein the session information is stored in a device file on the removable storage medium.

2. The computer-readable storage memory of claim 1, wherein the device stack generates the session information.

3. The computer-readable storage memory of claim 1, wherein the session information is recorded as a byte stream.

4. The computer-readable storage memory of claim 1, wherein the device file represents a session with the external device.

5. The computer-readable storage memory of claim 1, wherein the session information includes at least one transfer protocol entity.

6. The computer-readable storage memory of claim 1, wherein the session information includes header information.

7. The computer-readable storage memory of claim 1, wherein the session information includes media content.

8. The computer-readable storage memory of claim 7, wherein the device stack takes action on the media content.

9. The computer-readable storage memory of claim 1, wherein the device stack communicates with at least one digital rights management engine.

10. The computer-readable storage memory of claim 1, wherein the method further comprises:

obtaining second session information stored in the device file from the removable storage medium.

11. A method of content transfer, the method comprising:

at a computer, obtaining at least one device parameter from a removable storage medium, the at least one device parameter specifying at least one property of an external device, wherein content transfer occurs between the computer and the external device via the removable storage medium, wherein further the removable storage medium is movable between the computer and the external device;

creating a device stack on the computer based on the at least one device parameter, wherein the device stack is software configured to facilitate communication by simulating a connection to the external device;

based on the at least one device parameter, creating a virtual layer that simulates operation of the external device such that the external device appears to be connected to the computer;

generating session information based on the device stack; and transmitting the session information from the computer to the removable storage medium, wherein the session information is stored in a device file on the removable storage medium.

12. The method of claim 11, wherein the device stack generates the session information.

13. The method of claim 11, wherein the session information is recorded as a byte stream.

14. The method of claim 11, wherein the device file represents a session with the external device.

15. The method of claim 11, wherein the session information includes at least one transfer protocol entity.

16. A system for performing a method of content transfer, the system comprising:

a computing device having a processor and a memory, the computing device being configured to perform a method of:

obtaining at least one device parameter from a removable storage medium, the at least one device parameter specifying at least one property of an external device, wherein content transfer occurs between the computer and the external device via the removable storage medium, wherein further the removable storage medium is movable between the computer and the external device, creating a device stack on the computer based on the at least one device parameter, wherein the device stack is software configured to facilitate communication by simulating a connection to the external device, based on the at least one device parameter, creating a virtual layer that simulates operation of the external device such that the external device appears to be connected to the computer, generating session information based on the device stack, and transmitting the session information from the computer to the removable storage medium, wherein the session information is stored in a device file on the removable storage medium.

17. The system of claim 16, wherein the device stack generates the session information.

18. The system of claim 16, wherein the session information is recorded as a byte stream.

19. The system of claim 16, wherein the device file represents a session with the external device.

20. The system of claim 16, wherein the session information includes at least one transfer protocol entity.

* * * * *